United States Patent
Silakov et al.

(10) Patent No.: US 12,124,842 B1
(45) Date of Patent: Oct. 22, 2024

(54) SYSTEMS AND METHODS FOR LAUNCHING MULTIPLE SOFTWARE VIRTUAL APPLIANCES INSIDE A SINGLE VIRTUAL ENVIRONMENT

(71) Applicant: Virtuozzo International GmbH, Schaffhausen (CH)

(72) Inventors: Denis Silakov, Moscow (RU); Dmitry Mishin, Moscow (RU); Igor Sukhikh, Moscow (RU)

(73) Assignee: Virtuozzo International GmbH, Schaffhausen (CH)

( * ) Notice: Subject to any disclaimer, the term of this patent is extended or adjusted under 35 U.S.C. 154(b) by 501 days.

(21) Appl. No.: 17/556,435

(22) Filed: Dec. 20, 2021

(51) Int. Cl.
  *G06F 9/455* (2018.01)
  *G06F 8/61* (2018.01)
  *G06F 8/658* (2018.01)

(52) U.S. Cl.
  CPC .......... *G06F 8/658* (2018.02); *G06F 8/63* (2013.01); *G06F 9/45558* (2013.01); *G06F 2009/45562* (2013.01)

(58) Field of Classification Search
  CPC ........ G06F 8/658; G06F 8/63; G06F 9/45558; G06F 2009/45562
  See application file for complete search history.

(56) References Cited

U.S. PATENT DOCUMENTS

| | | | |
|---|---|---|---|
| 2008/0320295 A1* | 12/2008 | Chong | G06F 9/4401 711/E12.008 |
| 2009/0300057 A1* | 12/2009 | Friedman | G06F 11/3664 707/999.102 |
| 2013/0061226 A1* | 3/2013 | Ammons | G06F 8/658 718/1 |

* cited by examiner

Primary Examiner — Diem K Cao
(74) Attorney, Agent, or Firm — ArentFox Schiff LLP; Michael Fainberg (57) ABSTRACT

Disclosed herein are systems and methods for launching multiple software virtual appliances inside a single virtual environment. In one aspect, a method includes detecting a base image on which a plurality of virtual appliances are based, wherein each of the plurality of virtual appliances is configured to be launched in a separate virtual environment. The method includes preparing a virtual environment that is compatible with the base image. For each respective virtual appliance in the plurality of virtual appliances, the method includes calculating a differential between the base image and the respective virtual appliance, and including the differential in a patch file. The method includes applying the patch file to the base image to form a final appliance, and launching the final appliance in the virtual environment.

20 Claims, 5 Drawing Sheets

SYSTEMS AND METHODS FOR LAUNCHING MULTIPLE SOFTWARE VIRTUAL APPLIANCES INSIDE A SINGLE VIRTUAL ENVIRONMENT

FIELD OF TECHNOLOGY

The present disclosure relates to the field of virtualization, and, more specifically, to systems and methods for launching multiple software virtual appliances inside a single virtual environment.

BACKGROUND

Software products are often distributed in a form of virtual appliances (e.g., as images in formats which are ready to be launched using some virtualization technology). Many software programs are provided as virtual appliances that only contain a minimalistic operating system and the program itself.

In a conventional scenario, if a user wants to launch multiple applications provided as virtual appliances, the user has to launch a separate virtual environment (e.g., a VM or a container) for each of them. This approach has some advantages. For example, if one application crashes, the crash may not affect another application. However, often the overhead introduced by this method outweighs its advantages. For example, a user may want to launch a set of programs that extensively communicate with each other, and the user may consider communication speed to be much more important than crash resistance.

SUMMARY

To address these shortcomings, aspects of the disclosure describe methods and systems for launching multiple software virtual appliances inside a single virtual environment (rather than separate virtual environments).

In one exemplary aspect, the techniques described herein relate to a method for launching multiple software virtual appliances inside a single virtual environment, the method including: detecting a base image with which each of a plurality of virtual appliances is compatible, wherein each of the plurality of virtual appliances is configured to be launched in a separate virtual environment; preparing a virtual environment with the base image; for each respective virtual appliance in the plurality of virtual appliances, calculating a differential between the base image and the respective virtual appliance; and including the differential in a patch file; applying the patch file to the base image to form a final appliance; and launching the final appliance in the virtual environment.

In some aspects, the techniques described herein relate to a method, wherein detecting the base image includes: determining a measure of similarity between each base image of the plurality of virtual appliances; in response to determining that the measure of similarity is greater than a threshold measure of similarity, selecting a respective base image of one of the plurality of virtual appliances as the base image to prepare the virtual environment on.

In some aspects, the techniques described herein relate to a method, wherein calculating the differential includes: identifying differences in files between the base image and the respective virtual appliance; and including the identified differences in the patch file.

In some aspects, the techniques described herein relate to a method, wherein applying the patch file to the base image includes: adding the identified differences to the base image.

In some aspects, the techniques described herein relate to a method, further including: determining that more than one respective virtual appliance in the plurality of virtual appliances modify a same file in the base image; and generating an alert requesting manual selection of a modification by the respective virtual appliance for inclusion in the patch file.

In some aspects, the techniques described herein relate to a method, wherein calculating the differential includes: identifying a set of commands used to create the respective virtual appliance from the base image; and including the set of commands in the patch file.

In some aspects, the techniques described herein relate to a method, wherein applying the patch file to the base image includes: performing commands from the patch file on the base image.

In some aspects, the techniques described herein relate to a method, wherein the plurality of virtual appliances includes a first virtual appliance and a second virtual appliance, further including: determining that a first command from the first virtual appliance and a second command from the second virtual appliance modify a same file in the base image, wherein both modifications are conflicting; and generating an alert requesting manual selection of the first command or the second command for inclusion in the patch file.

In some aspects, the techniques described herein relate to a method, wherein an initial configuration of at least one of the plurality of virtual appliances implies a separate virtual environment of a type different from a type of the prepared virtual environment.

It should be noted that the methods described above may be implemented in a system comprising a hardware processor. Alternatively, the methods may be implemented using computer executable instructions of a non-transitory computer readable medium.

In some aspects, the techniques described herein relate to a system for launching multiple software virtual appliances inside a single virtual environment, the system including: a hardware processor configured to: detect a base image with which each of a plurality of virtual appliances is compatible, wherein each of the plurality of virtual appliances is configured to be launched in a separate virtual environment; prepare a virtual environment that is compatible with the base image; for each respective virtual appliance in the plurality of virtual appliances, calculate a differential between the base image and the respective virtual appliance; and include the differential in a patch file; apply the patch file to the base image to form a final appliance; and launch the final appliance in the virtual environment.

In some aspects, the techniques described herein relate to a non-transitory computer readable medium storing thereon computer executable instructions for launching multiple software virtual appliances inside a single virtual environment, including instructions for: detecting a base image with which each of a plurality of virtual appliances are compatible, wherein each of the plurality of virtual appliances is configured to be launched in a separate virtual environment; preparing a virtual environment that is compatible with the base image; for each respective virtual appliance in the plurality of virtual appliances, calculating a differential between the base image and the respective virtual appliance; and including the differential in a patch file; applying the patch file to the base image to form a final appliance; and launching the final appliance in the virtual environment.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for launching multiple software virtual appliances inside a single virtual environment. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

The present disclosure describes systems and methods for launching multiple software virtual appliances inside a single virtual environment. In one aspect, a single virtual appliance that merges all required appliances is prepared, and then the single virtual appliance is launched in a virtual environment. The present disclosure thus also describes systems and methods for preparing appliances that would be suitable to use by any virtualization technology, even, in some aspects, different from the original one (e.g., transforming several application container images (e.g., Docker images) to be used inside a system (e.g., Virtuozzo) container).

According to one aspect of the disclosure, a Virtual Environment (VE) is a type of isolated environment that supports program code execution. Examples of VEs can be any kind of virtual machines (VMs, including lite VMs), containers (including operating system (OS) containers, stateless containers, execution containers, system containers, application containers, etc.), or any kind of isolated environment. In some aspects, from the point of view of the user or a process running in a VE, the code in the VE runs as if it were running on the real computing system. In one aspect, at least a part of the real hardware or software utilized for running program code are presented in the VE as their virtual analogs. In one aspect, several VEs may be running on the same physical machine simultaneously.

According to one aspect of the disclosure, a Virtual Machine (VM) is a type of a VE. In one aspect, several VMs may be running on the same physical machine simultaneously, wherein hardware resources are virtualized. In one aspect, each VM instance executes its own OS kernel (i.e., guest OS kernel). In one aspect, support of Virtual Machines is implemented using a Virtual Machine Monitor and/or a Hypervisor.

According to one aspect of the disclosure, a Container (CT) (e.g., including OS or system containers, stateless or application containers, or execution containers, etc.) is an isolated environment (e.g., a type of virtual execution environment) that supports program code execution. In some aspects, a container is defined as a group of processes isolated from other processes running on the computing device. In some aspects, isolation of containers is implemented at least on the namespace level. In some aspects, containers running on the same computing device, share a host operating system (OS) kernel of the computing device and at least some of the system resources. In some aspects, multiple sets of applications or services are organized on a single hardware system by placing them into isolated containers.

According to one aspect of the disclosure, a Virtual Appliance (VA) is a file or a set of files, containing an application (a service, a program, etc.) that can be launched in a VE. In some aspects, a VA is a pre-configured VE image ready to be launched in a VE of a special type (e.g., a VM or a system container, or an application container, etc.). In some aspects, a VA may be presented in a form of an image (or a set of images) in appropriate format, which can be called a VA image, and which is ready to be launched in a VE. In some aspects, a VA image may contain at least files (e.g., files containing executable instructions, files with application data, configuration files, files with data, etc.) needed to launch the application in a VE. In some aspects, a VA image may contain an application and a base image of the OS, on which the application shall be executed. In some aspects, different types of images, may correspond to different types of VEs. In some aspects, a VA may be in form of a VA image stored on the computing device, a set of commands for creation of a VA image from a base image, a VE with a VA image, or etc.

Figure 1:
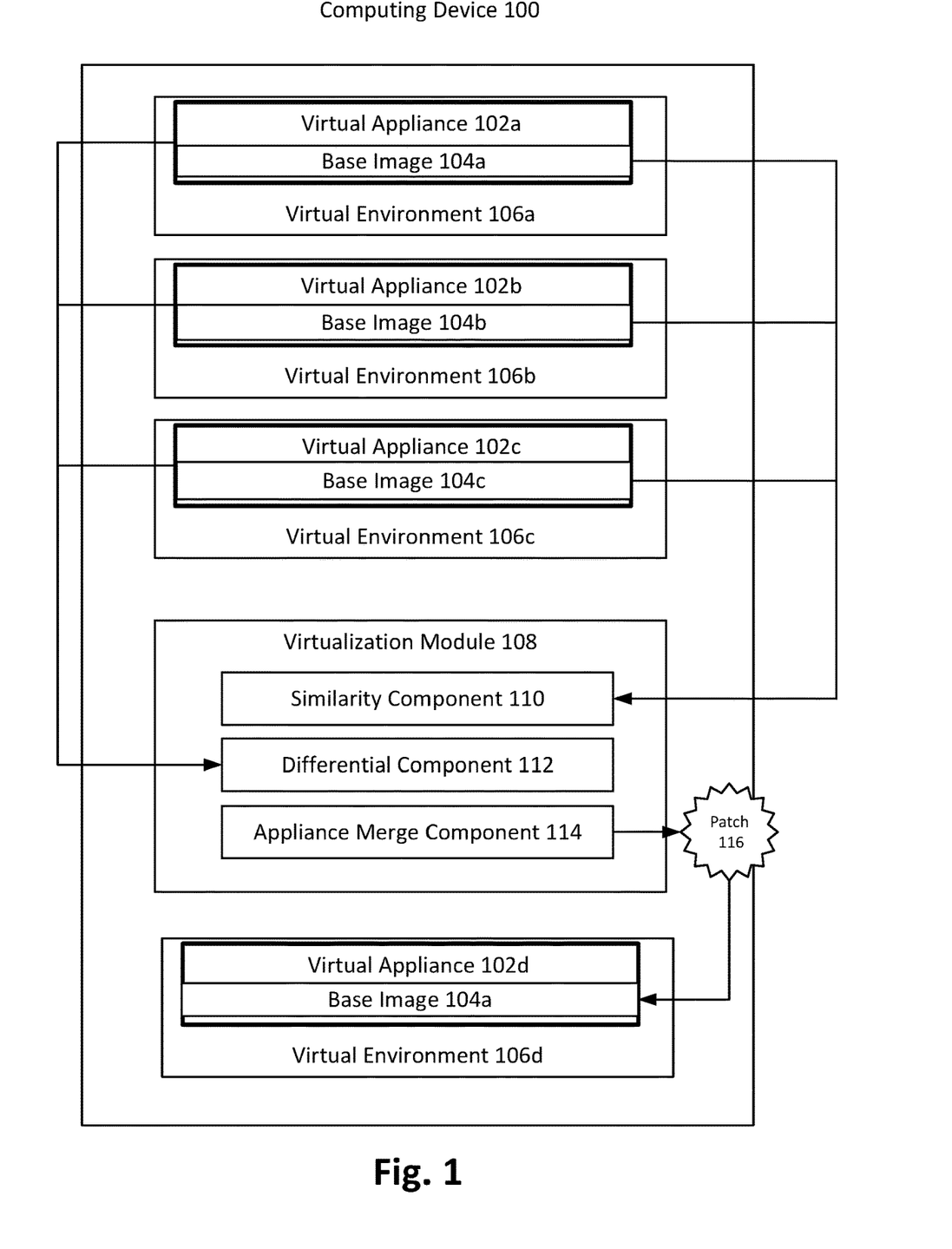
FIG. 1 is a block diagram illustrating a computing device for launching multiple software virtual appliances inside a single virtual environment.

FIG. 1 is a block diagram illustrating computing device 100 for launching multiple software virtual appliances inside a single virtual environment. Computing device 100 may be a computer system that is described in FIG. 5. In one aspect, the computing device 100 may be representative of a plurality of different devices, such as, for example, distributed systems or multiple servers utilized to perform operations "over the cloud". Computing device 100 is configured to execute a plurality of virtual appliances (e.g., 102), on separate virtual environments (e.g., 106). For example, the computing device may have virtual appliances 102a, 102b and 102c configured to be launched in separate virtual environments (e.g., virtual environments 106a, 106b and 106c may exist for launching the virtual appliances). In one aspect, VEs 106a, 106b, 106c are optional and are not used.

In some aspects, a VA (e.g., any of 102a, 102b, 102c) may be presented on the computing device, for example, as a VA image stored on the computing device, as a set of commands for creation of a VA image, as a VE with a VA image, etc. In some aspects, VEs of different types (e.g., a system container, an application container, a VM, etc.) may be used for the purposes of this disclosure. For example, different VEs on the computing device may have different types and require different virtualization technologies.

In one aspect, virtualization module 108 may be a part of a virtualization system responsible for launching new virtual environments (e.g., of different types). In one aspect, virtualization module 108 also include: similarity component 110, differential component 112 and appliance merge component 114, which can be used for launching multiple software virtual appliances inside a single virtual environment.

As described previously, it may be in the interest of a user to run virtual appliances 102a, 102b, and 102c in a single virtual environment. In one aspect, virtualization module 108 is configured to enable this using: an ability to create VEs, similarity component 110, differential component 112, and appliance merge component 114. In one aspect, a user (e.g., a host administrator, a container user, a management process, etc.) may request creation of a virtual environment based on multiple virtual appliances (VAs). For example, in one aspect, virtualization module 108 may receive a user selection of virtual appliances 102a, 102b, and 102c for launch in a single virtualization environment (e.g., of a particular type that may or may not be specified by user).

In one aspect, when the virtual appliances (VAs) to be merged are determined (e.g., based on receiving the user selection), virtualization module 108 may detect base images (e.g., images containing an OS) on which the virtual appliances are based. For example, virtual appliance 102a is based on base image 104a, virtual appliance 102b is based on base image 104b, and virtual appliance 102c is based on base image 104c. In different aspects, any kinds of virtual appliances can be used, such as containing network services, network client and/or server software, storage client and/or server software, databases, various applications, games, management tools, and so on. Moreover, in different aspects, any kind of base images can be used, such as one containing any kind of operating system (OS) (e.g., Windows, Linux, MacOS, FreeBSD, Unix, etc.). In some aspects, different VAs can have base images containing the same or different OSes, the same or different distributions of an OS, or even different modifications of the same OS, etc. In one example, virtual appliance 102a may be an nginx appliance, which is created on a base image 104a of CentOS 7 by installing and configuring the nginx package.

In one aspect, the similarity component 110 determines whether the VAs are compatible and are able to run in a same VE.

In one aspect, virtualization module 108 may determine, via similarity component 110, whether the base images of the VAs are compatible. Similarity component 110 may, for example, determine a measure of similarity (e.g., "different," "similar," "exact match") and/or any parameters of compatibility (e.g., "different OS", "different distributions of the same OS", "same OS kernel", "conflicting libraries", "compatible"), which in some aspects, is defined by similarity component rules. In one aspect, the rules may be stored in a rules database accessible to similarity component 110, or be a similarity component's inner logic, etc. In one example, base images are considered compatible if they are based on the same OS kernel. In one example, a rule may indicate that one base image is considered "similar" to another base image, if the images are clones of the same exact operating system (OS) (e.g., CentOS 7, VzLinux 7, Oracle Linux 7). In another example, rule may indicate that two base images are considered "similar" if they include different versions of the same OS. In yet another example, similarity component 110 may compare distributions of the same OS by analyzing any OS parameters (e.g., "/etc/os-release" files) of each distribution. For example, in response to determining that the parameters (e.g., VERSION_ID and/or ID_LIKE) are the same, similarity component 110 may determine that the images can be considered "similar", "compatible". In some aspects, the measure of similarity is a quantitative value (e.g., one a scale of 1 to 10, where 1 is "no match" and 10 is "exact match"). The measure of similarity may be a function of the number of parameters that match between two base images. Examples of parameters may be: the same operating system, the same OS kernel, version ID, drivers, etc. In one aspect, each parameter may be weighted differently (e.g., the weight of the operating system kernel may be a lot higher than the weight of the distribution version ID). In yet some other aspects, the determination of whether base images are compatible or not includes a determination of whether at least some of API, libraries or files needed for running application of the appliances, are compatible to each other. In yet some other aspects, the determination of whether base images are compatible or not includes a determination of whether the application from first VA can run on the base image of the second VA.

In one aspect, based on results of determination of VAs or corresponding base images compatibility, the virtualization module 108 selects a base image (one of those specified in VA images, or a predefined one, or etc.), which shall become the base image for the merged virtual appliance. For example, the selected base image shall be compatible to all VAs, which shall be in the merged virtual appliance.

Consider the following examples. If the base images are exact matches, virtualization module 108 selects the base image as the base image for the merged virtual appliance. If the base images are similar (e.g., measure of similarity is "similar" or is a quantitative value (e.g., "7") greater than a threshold measure of similarity (e.g., "5")), in some aspects, virtualization module 108 may select one of them, such as the base image that is the latest version of the base images (or the most stable of them, or having the highest number of pre-installed libraries, or configured to have best performance, or the one that is used by VAs, etc.). For example, if base image 104b is the latest version, virtualization module 108 selects base image 104b. In some other aspects, virtualization module 108 may select a base image that is compatible with all of the virtual appliances 102. For example, if base image 104a is compatible with all virtual appliances 102, virtualization module 108 selects base image 104a.

Virtualization module 108 then prepares a virtual environment (e.g., 106d; or at least a disk image for such VE) with a compatible base image (e.g., the selected base image). In different aspects, the prepared VE (e.g., 106d) can be of the same or of a different type comparing to types of VEs implied/needed by VAs (e.g., VAs 102a, and its corresponding VE 106a). For example, in one aspect, VE 106a may be an application container and VE 106d may be a system container. In one aspect, the type of resulting VE (e.g., VE 106d) can also be selected by user or a management tool. In one aspect, the VE may be created from a snapshot or a template, containing compatible base image (e.g., compatible to all VAs that shall be merged).

For example, if a different virtualization technology (e.g., different type of VE) is going to be used for the joint VA (i.e., the merged VA), virtualization module 108 then prepares a virtual environment with the selected base image. For example, if VA images of application containers (e.g., stateless container such as Docker, etc.) based on an OS (e.g., CentOS 7, etc.) are to be jointly used in a system container (e.g., a stateful container such as Virtuozzo container), virtualization module 108 first prepares a system container with the OS (e.g., with pure CentOS 7).

Virtualization module 108 then merges VAs (e.g., the VAs that shall be launched jointly in the VE). In one aspect, as a part of a merge, differential component 112 calculates differences (e.g., a set of files that differ, and/or a set of commands that create VA from the base image (e.g., the commands that in turn result in adding/removing/changing some files), etc.) between every virtual appliance image and the selected base image. Appliance merge component 114 merges these differences into a single patch 116 (e.g., a full set of files that shall be added/removed/changed and/or a full set of commands that shall be performed, in order to launch VAs in resulting VE). Virtualization module 108 then applies (e.g., by adding/removing/changing files and/or performing commands (in one aspect, the commands will also result in adding/removing/changing files), etc.) the patch (e.g., 116) to the selected base image to form the final appliance. For example, if the selected base image is base image 104a, virtualization module 108 generates virtual appliance 102d, which is a merged virtual appliance featuring content (e.g., applications) from virtual appliances 102a, 102b, and 102c, by applying patch 116 on base image 104a. In one aspect, virtualization module 108 launches virtual appliance 102d on virtual environment 106d, which is equivalent to launching virtual appliances 102a, 102b, and 102c on the same virtual environment.

In some aspects, the calculation, merging and applying can be performed in at least two ways: based on image files or based on commands (e.g., which cause adding/removing/changing some files the files). One way is described in FIG. 2 and the other way is described in FIG. 3. In some aspects, both variants can be combined (e.g., used for different VAs from all VAs that shall be launched in the same resulting VE). In one aspect, for example, when a base image is selected, several VAs are merged with the selected base image and each other based on their image files, and the result is used as a base image for merging other VAs based on their sets of commands.

Figure 2:
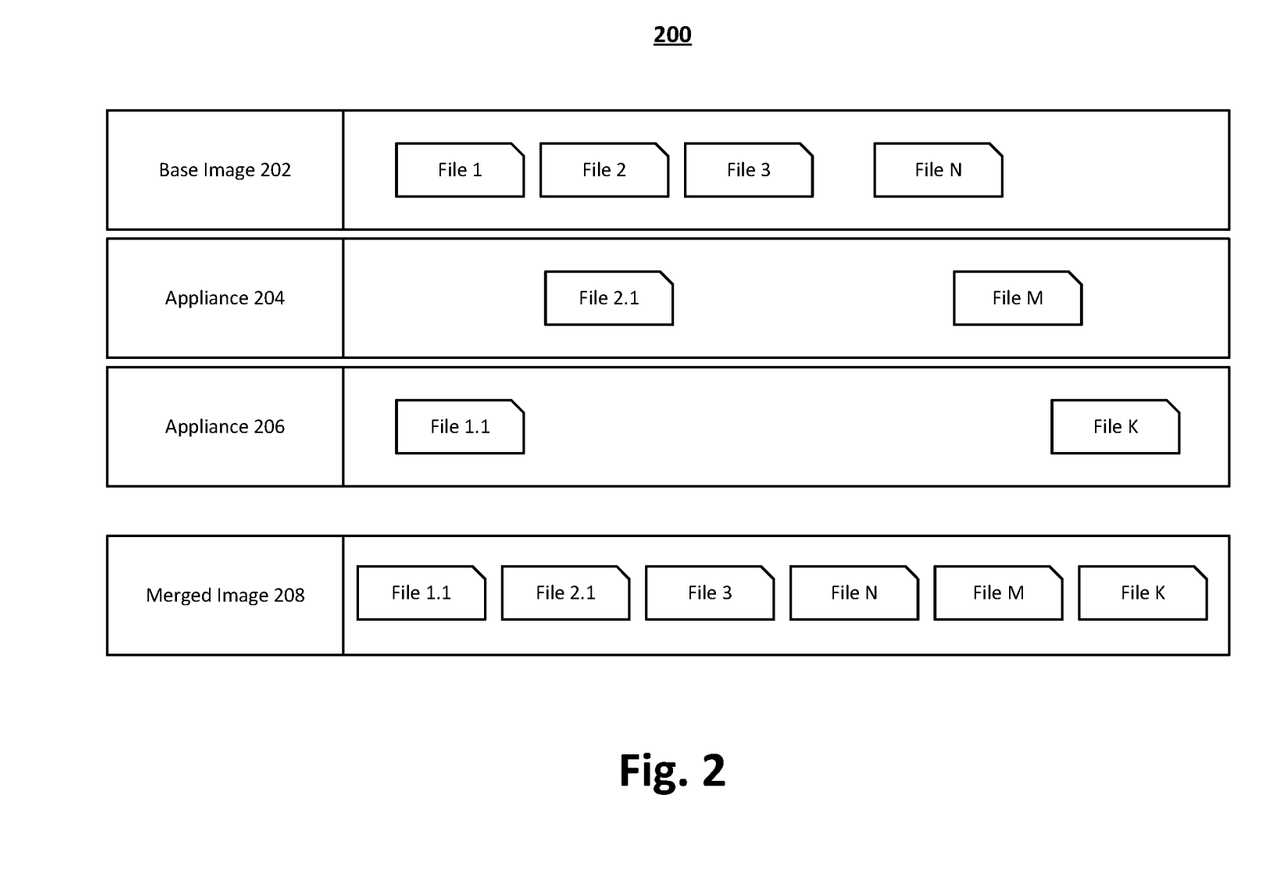
FIG. 2 is a block diagram illustrating generating a merged image based on different files from each virtual appliance image.

FIG. 2 is a block diagram illustrating example 200 for generating a merged image based on different files from each virtual appliance images.

In some aspects, a file system-based differential is used. More specifically, for an appliance, the example implementation involves checking which files are added/modified/removed compared to the base image (e.g., the base image of the resulting VE; VE disk image, etc.). A set of such file changes form a patch (e.g., patch 116). For example, base image 202 (e.g., the base image of the resulting VE) may comprise files 1-N. Virtual appliance 204 may have file 2.1—a modification of file 2. Virtual appliance 204 may also add file M, which previously did not exist in base image 202. Virtual appliance 206 may have file 1.1—a modification of file. Virtual appliance 206 may also add file K. For each virtual appliance (e.g., that is selected by the user for launch in a single virtual environment), differential component 112 may identify files that are different from base image 202. When scanning virtual appliance 204, differential component 112 may identify files 2.1 and M. When scanning virtual appliance 206, differential component 112 may identify files 1.1 and K. Appliance merge component 114 generates a patch that includes each of the identified files (e.g., file 1.1, 2.1, M, and K) and virtualization module 108 applies the patch to base image 202. During application of the patch, the new files may be added and the replaced files (e.g., file 2) may be deleted or changed. The applied patch produces merged image 208, which includes files 1.1, 2.1, 3-N, M, and K (e.g., file 2 may be replaced by 2.1).

In one aspect, to prevent conflicting modifications (e.g., in case if patches from different appliances intersect with each other (e.g., two VAs require different versions of the same file (e.g., a configuration file, a library, etc.))), at least some of the following steps may be performed (e.g., virtualization module 108 or any of its parts): sending a notification to user or to a management tool (and receiving instruction about which variant to use); generating an alert requesting manual selection of a modification (e.g., one of the file versions) for inclusion in the patch file; further analyzing whether the changes to the same file are compatible (e.g., in case where two or more VAs need to change independent parameters in a system configuration file); further analyzing whether one of the file versions is still compatible to all VAs (e.g., is a library that has greater version and provides backward compatibility, etc.); taking (e.g., from a database, etc.) a predefined version of the file (e.g., compatible with all VAs, or tested previously to be able to work with a combination of appliances of the kind, etc.). In one example, both appliances 204 and 206 may have modification to the same file and a user may decide how the resulting file modified by multiple patches will look like. In another example, if one combines two virtual appliances (e.g., Nginx and PostgreSQL), and both of them modify a configuration file (e.g., /etc/sysctl.conf file) for tuning the system performance, so the virtualization module 108 determines (e.g., by asking user review changes made by both appliances to this file and decide; or by taking the resulting file from a database; or etc.) how the resulting file in the merged image should look like.

Figure 3:
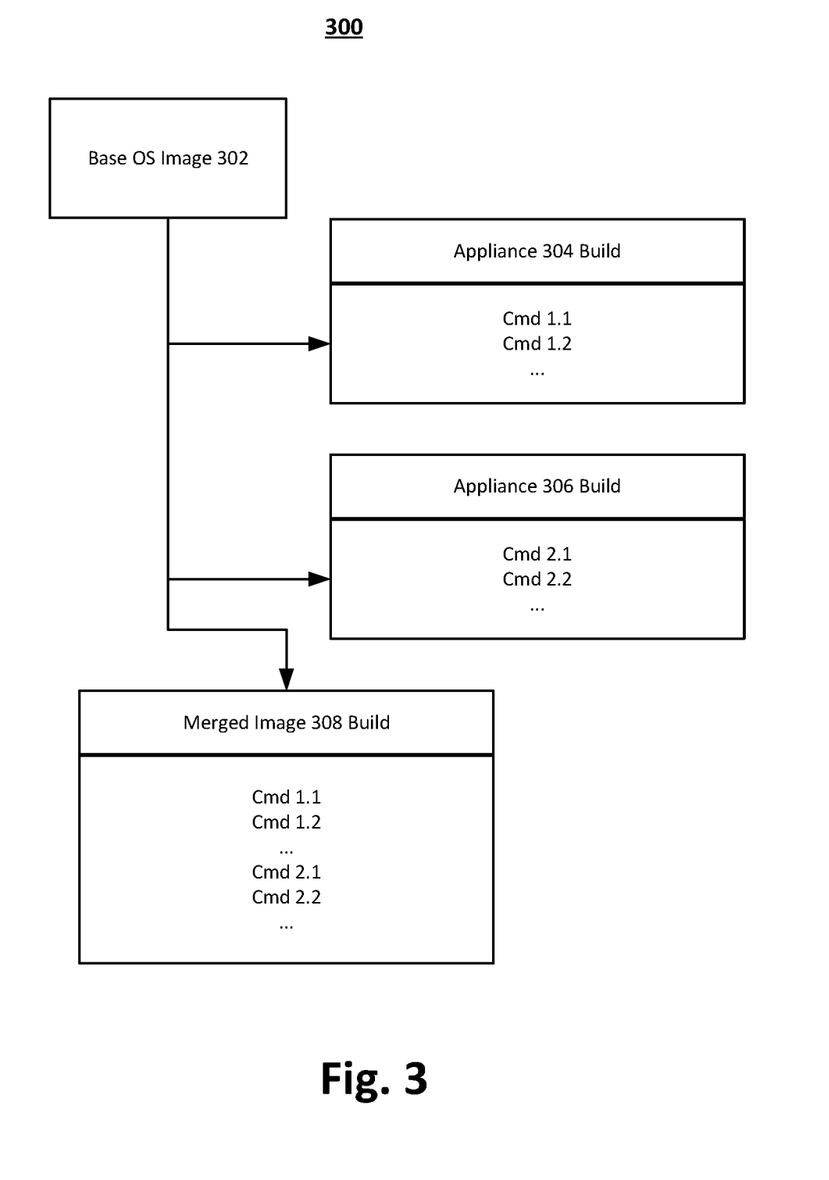
FIG. 3 is a block diagram illustrating generating a merged image based on different commands performed during the appliance creation.

FIG. 3 is a block diagram illustrating example 300 for generating a merged image based on different commands performed during in appliance creation.

In some aspects, a build-time based differential is used. In this example, for an appliance, there is a set of commands used to create the appliance from the base image. In one example, commands may involve a Docker file for Docker images, kickstart files for OpenStack appliances based on RHEL, or any appropriate format of commands applicable to creation a VA or a VE with a VA, etc. In this example, sets of commands for appliances are applied to/performed on the base image (e.g., the base image of the resulting VE; VE disk image, etc.) in a particular order, for example: the order may be defined by user, by virtualization module inner logic, taken form a database, based on VA dependencies (e.g., from each other, or common dependencies from libraries, etc.), based on VA priorities, etc.; commands may be performed one by one, or in parallel (e.g., if they are independent); etc. Referring to example 300, building of appliance 304 may include a first plurality of commands (e.g., cmd 1.1, cmd 1.2, etc.) applied to base OS image 302. Building of appliance 306 may include a second plurality of commands (e.g., cmd 2.1, 2.2, etc.). Differential component 112 may identify each unique command between the two sets of commands (e.g., commands modifying different existing files or adding different new files). Appliance merge component 114 may generate a patch that includes commands from the two builds (in some cases, the commands that are in common in the sets of commands may be replaced by one or performed both—depending on the commands). This forms merged image 308 (e.g., comprising commands 1.1, 1.2, 2.1, 2.2, etc.). Virtualization module 108 may execute commands from the patch (e.g., sets of commands for building every virtual appliance may be applied to/performed on the base image (e.g., base OS image 302)).

In some aspects, to prevent conflicting modifications (e.g., in case if several appliances modify the same file (e.g., a configuration file, a library, etc.) and their modifications conflict with each other) the at least some of the following steps may be performed (e.g., virtualization module 108 or any of its parts): sending notification to user or to a management tool (and receiving instruction about which variant to use); generating an alert requesting manual selection of a command for inclusion in the patch; further analyzing whether the changes to the same file are compatible (e.g., in case where two or more commands change independent parameters in a system configuration file); further analyzing whether a file created by one of the commands will still be compatible to all VAs (e.g., is a library that has greater version and provides backward compatibility, etc.); replacing the conflicting commands by an instruction to take (e.g., from a database, etc.) a predefined version of the file (e.g., compatible with all VAs, or tested previously to be able to work with a combination of appliances of the kind, etc.). For example, if two commands modify the same file, virtualization module 108 may generate an alert requesting manual selection of the first command or the second command for inclusion in the patch file. If the user selects the first command, virtualization module 108 includes the first command in the patch file and omits the second command. In one aspect, if any of the commands fails virtualization module 108 may also generate an alert to user. In one aspect, if a selected base image already contains a file, merging is performed based on commands, and a command is related to the file, then a command may be performed, not performed or any of the actions for preventing conflicting modifications may be performed—depending on the command (e.g., a command for creation of an already existing file may be omitted).

Figure 4:
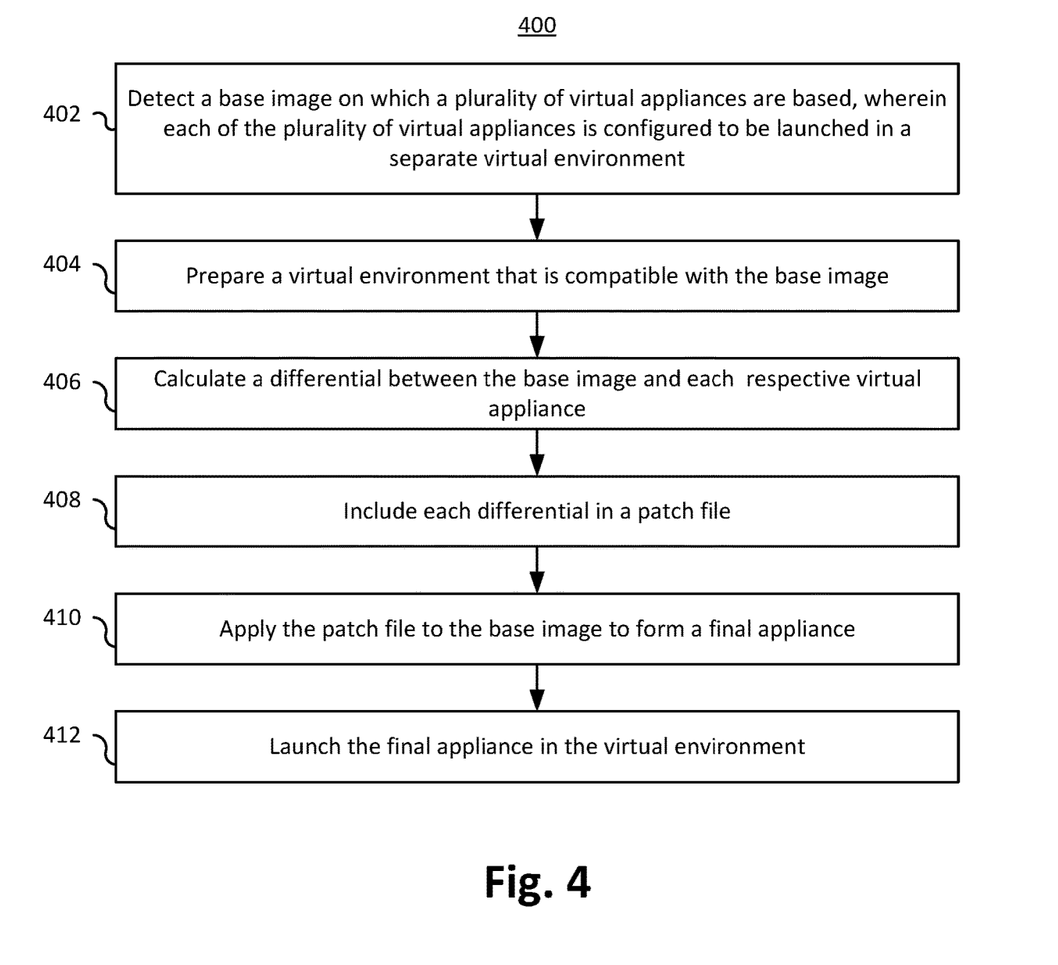
FIG. 4 illustrates a flow diagram of a method for launching multiple software virtual appliances inside a single virtual environment.

FIG. 4 illustrates a flow diagram of method 400 for launching multiple software virtual appliances inside a single virtual environment. While the various actions in the scenarios are discussed in a particular order, it is to be appreciated that the actions can be performed in different orders than those depicted and at least some of the actions may be performed concurrently with one another.

At 402, virtualization module 108 detects a base image on which a plurality of virtual appliances are based, wherein each of the plurality of virtual appliances is configured to be launched in a separate virtual environment.

At 404, virtualization module 108 prepares a virtual environment with the base image (e.g. a system container).

At 406, virtualization module 108 calculates a differential between the base image and each respective virtual appliance.

At 408, virtualization module 108 includes each differential in a patch file.

At 410, virtualization module 108 applies the patch file to the base image to form a final appliance.

At 412, virtualization module 108 launches the final appliance in the virtual environment.

One simplified example of VAs may be the following. Consider an example in which there are two VA images (e.g., application container (e.g., Docker) images) created using the following commands (e.g., Docker files). A first image (e.g., Image1) having an OS (e.g., VzLinux8) as a base image with a network server (e.g., httpd server) installed on the base image, wherein VA image creation could be performed by the first set of commands (e.g., "FROM virtuozzo/vzlinux8", "RUN yum install -y httpd"). A second image (e.g., Image2) having an OS (e.g., VzLinux8) as a base image with a database server (e.g., MySQL server) installed on the base image, wherein VA image creation could be performed by the second set of commands (e.g., "FROM virtuozzo/vzlinux8" "RUN yum install -y mysql"). For simplicity, it can also be assumed that the network server (e.g., httpd) package installs all its files in a first directory (e.g., /opt/httpd) and the database server (e.g., MySQL) package installs all its files in a second directory (e.g., /opt/mysql directory). As described previously, these two different VAs are supposed to be used in two different virtual environments (e.g., application containers, such as Docker containers). A user may opt, however, to get a single virtual environment (e.g., a system container, such as a Virtuozzo container), based on these two images, where both applications (httpd and MySQL) will be running.

In such simplified example, virtualization module 108 detects base images of both VAs, and determines the base image of a resulting VE. For example, virtualization module 108 detects that both images are based on the same OS distribution (e.g., VzLinux8) and thus chooses this distribution as a base system for the new appliance. Then virtualization module 108 creates the resulting single VE (e.g., a system container) based on the determined base image.

In such a simplified example, as described previously, two alternative approaches may be used for merging VAs—analyzing files inside the built images and analyzing image build instructions.

In the first case, virtualization module 108 takes the differential between the first image (e.g., image1) and the chosen base image (e.g., vzlinux8) and the second image (e.g., image 2) and the chosen base image (e.g., vzlinux8). Calculating the differential involves comparing files inside these images. For example, virtualization module 108 may determine that the first appliance image adds a first directory (e.g., /opt/httpd folder) to the chosen base image and the second appliance image differs from the chosen base image by a new second directory) e.g., /opt/mysql folder). Both of these folders are added to a patch, which virtualization module 108 then applies to the chosen base image (i.e., both folders are copied into the chosen base image).

In the second approach, virtualization module 108 analyzes sets of commands. Virtualization module 108 takes all instructions from the first set of commands and applies them to the pure environment (i.e., created VE with the chosen base image (e.g., VzLinux8)). In case where instructions are "FROM virtuozzo/vzlinux8", "RUN yum install -y httpd", there is only one 'RUN' instruction that launches 'yum install -y httpd' command; thus, virtualization module 108 launches 'yum install -y httpd' inside the pure VzLinux8 environment. In the same way, virtualization module 108 analyzes the second set of commands and determines to execute those commands (e.g., 'yum install -y mysql') in the environment (which consists of chosen base image (e.g., VzLinux8) with first application (e.g., httpd) installed). Ultimately this forms a single virtual environment 'merged' from the two initial VA images.

It should be noted that real VA images and commands are often more complex and contain different types (e.g., not only RUN) of instructions. As a result, their analysis is not as simplistic. However, the complete set of instructions is still rather limited and technically it is not hard to perform all of them inside the new virtual environment.

Figure 5:
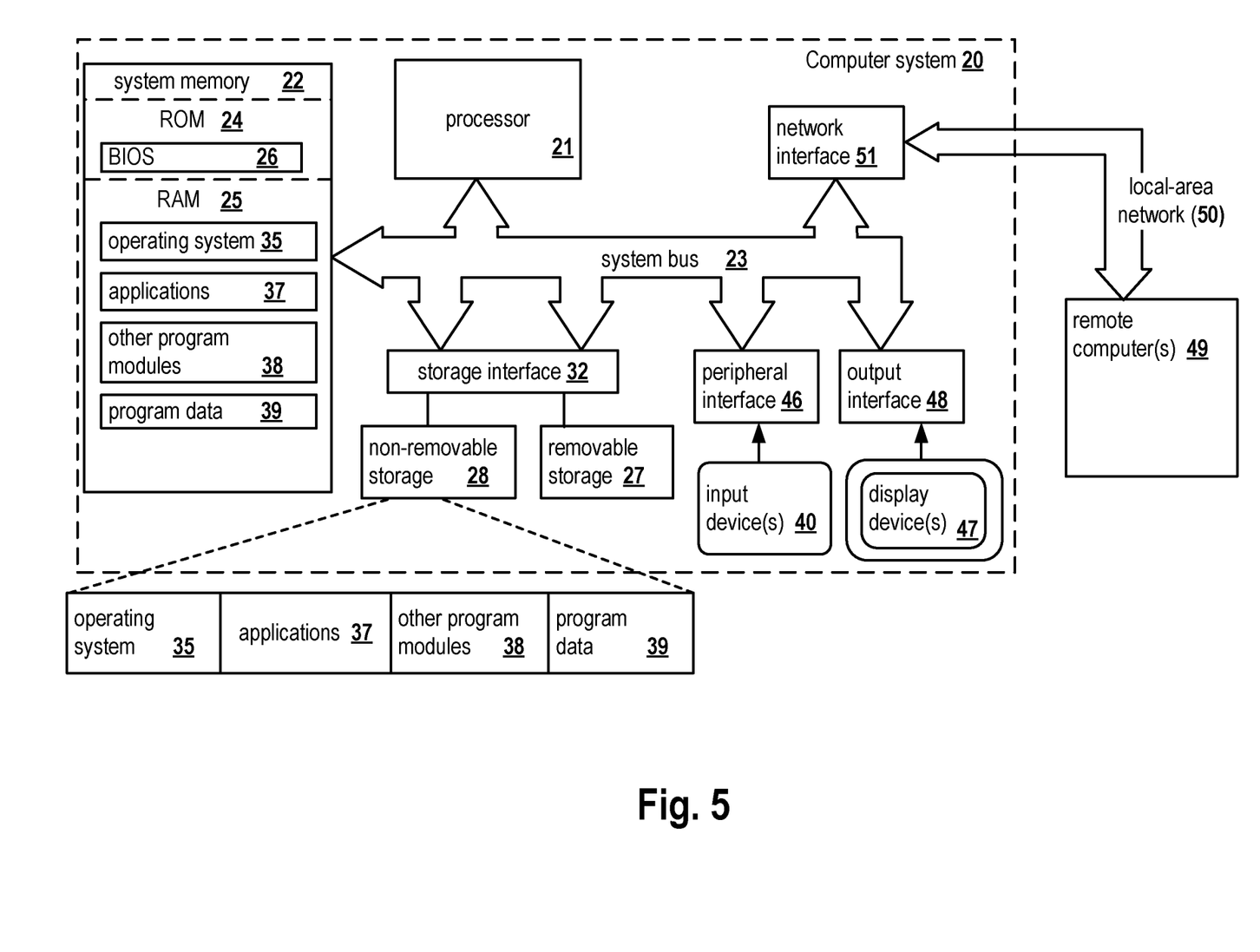
FIG. 5 presents an example of a general-purpose computer system on which aspects of the present disclosure can be implemented.

FIG. 5 is a block diagram illustrating a computer system 20 on which aspects of systems and methods for launching multiple software virtual appliances inside a single virtual environment may be implemented in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, 12C, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-4 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for launching multiple software virtual appliances inside a single virtual environment, the method comprising:
   detecting a base image with which each of a plurality of virtual appliances is compatible, wherein each of the plurality of virtual appliances is configured to be launched in a separate virtual environment;
   preparing a virtual environment with the base image;
   for each respective virtual appliance in the plurality of virtual appliances,
      calculating a differential between the base image and the respective virtual appliance; and
      including the differential in a patch file;
   applying the patch file to the base image to form a final appliance; and
   launching the final appliance in the virtual environment.

2. The method of claim 1, wherein detecting the base image comprises:
   determining a measure of similarity between each base image of the plurality of virtual appliances;
   in response to determining that the measure of similarity is greater than a threshold measure of similarity, selecting a respective base image of one of the plurality of virtual appliances as the base image to prepare the virtual environment on.

3. The method of claim 1, wherein calculating the differential comprises:
   identifying differences in files between the base image and the respective virtual appliance; and
   including the identified differences in the patch file.

4. The method of claim 3, wherein applying the patch file to the base image comprises:
   adding the identified differences to the base image.

5. The method of claim 3, further comprising:
   determining that more than one respective virtual appliance in the plurality of virtual appliances modify a same file in the base image; and
   generating an alert requesting manual selection of a modification by the respective virtual appliance for inclusion in the patch file.

6. The method of claim 1, wherein calculating the differential comprises:
   identifying a set of commands used to create the respective virtual appliance from the base image; and
   including the set of commands in the patch file.

7. The method of claim 6, wherein applying the patch file to the base image comprises:
   performing commands from the patch file on the base image.

8. The method of claim 6, wherein the plurality of virtual appliances comprises a first virtual appliance and a second virtual appliance, further comprising:
   determining that a first command from the first virtual appliance and a second command from the second virtual appliance modify a same file in the base image, wherein both modifications are conflicting; and generating an alert requesting manual selection of the first command or the second command for inclusion in the patch file.

9. The method of claim 1, wherein an initial configuration of at least one of the plurality of virtual appliances implies a separate virtual environment of a type different from a type of the prepared virtual environment.

10. A system for launching multiple software virtual appliances inside a single virtual environment, the system comprising:
a hardware processor configured to:
detect a base image with which each of a plurality of virtual appliances is compatible, wherein each of the plurality of virtual appliances is configured to be launched in a separate virtual environment;
prepare a virtual environment that is compatible with the base image;
for each respective virtual appliance in the plurality of virtual appliances,
calculate a differential between the base image and the respective virtual appliance; and
include the differential in a patch file;
apply the patch file to the base image to form a final appliance; and
launch the final appliance in the virtual environment.

11. The system of claim 10, wherein the hardware processor is further configured to detect the base image by:
determining a measure of similarity between each base image of the plurality of virtual appliances;
in response to determining that the measure of similarity is greater than a threshold measure of similarity, selecting a respective base image of one of the plurality of virtual appliances as the base image to prepare the virtual environment on.

12. The system of claim 10, wherein the hardware processor is further configured to calculate the differential and apply the patch file to the base image by:
identifying differences in files between the base image and the respective virtual appliance;
including the identified differences in the patch file; and
adding the identified differences to the base image.

13. The system of claim 10, wherein the hardware processor is further configured to:
determine that more than one respective virtual appliance in the plurality of virtual appliances modifies a same file in the base image; and
generate an alert requesting manual selection of a modification by the respective virtual appliance for inclusion in the patch file.

14. The system of claim 10, wherein the hardware processor is further configured to calculate the differential and apply the patch file to the base image by:
identify a set of commands used to create the respective virtual appliance from the base image;
include the set of commands in the patch file; and
perform commands from the patch file on the base image.

15. The system of claim 14, wherein the plurality of virtual appliances comprises a first virtual appliance and a second virtual appliance, wherein the hardware processor is further configured to:

determine that a first command from the first virtual appliance and a second command from the second virtual appliance modify a same file in the base image, wherein both modifications are conflicting; and
generate an alert requesting manual selection of the first command or the second command for inclusion in the patch file.

16. The system of claim 10, wherein an initial configuration of at least one of the plurality of virtual appliances implies a separate virtual environment of a type different from a type of the prepared virtual environment.

17. A non-transitory computer readable medium storing thereon computer executable instructions for launching multiple software virtual appliances inside a single virtual environment, including instructions for:
detecting a base image with which each of a plurality of virtual appliances are compatible, wherein each of the plurality of virtual appliances is configured to be launched in a separate virtual environment;
preparing a virtual environment that is compatible with the base image;
for each respective virtual appliance in the plurality of virtual appliances,
calculating a differential between the base image and the respective virtual appliance; and
including the differential in a patch file;
applying the patch file to the base image to form a final appliance; and
launching the final appliance in the virtual environment.

18. The non-transitory computer readable medium of claim 17, wherein an instruction for detecting the base image comprises instructions for:
determining a measure of similarity between each base image of the plurality of virtual appliances;
in response to determining that the measure of similarity is greater than a threshold measure of similarity, selecting a respective base image of one of the plurality of virtual appliances as the base image to prepare the virtual environment on.

19. The non-transitory computer readable medium of claim 17, wherein an instruction for calculating the differential and applying the patch file to the base image includes instructions for:
identifying differences in files between the base image and the respective virtual appliance;
including the identified differences in the patch file; and
adding the identified differences to the base image.

20. The non-transitory computer readable medium of claim 17, wherein an instruction for calculating the differential and applying the patch file to the base image includes instructions for:
identifying a set of commands used to create the respective virtual appliance from the base image;
including the set of commands in the patch file; and
perform commands from the patch file on the base image.

* * * * *